(12) United States Patent
Okutani et al.

(10) Patent No.: US 12,257,976 B1
(45) Date of Patent: Mar. 25, 2025

(54) USER MANAGEMENT SYSTEM FOR WORKING VEHICLE

(71) Applicant: TAKEUCHI MFG. CO., LTD., Nagano (JP)

(72) Inventors: Shumpei Okutani, Nagano (JP); Yuuki Jinno, Nagano (JP); Yutaro Yamazaki, Nagano (JP); Mio Kodama, Nagano (JP)

(73) Assignee: TAKEUCHI MFG. CO., LTD. (JP)

( * ) Notice: Subject to any disclaimer, the term of this patent is extended or adjusted under 35 U.S.C. 154(b) by 0 days.

(21) Appl. No.: 18/414,637

(22) Filed: Jan. 17, 2024

(30) Foreign Application Priority Data

Oct. 30, 2023 (JP) .................................. 2023-185274

(51) Int. Cl.
| | | |
|---|---|---|
| *B60R 25/04* | (2013.01) | |
| *B60R 25/24* | (2013.01) | |
| *E02F 9/24* | (2006.01) | |
| *E02F 9/26* | (2006.01) | |
| *F02N 11/08* | (2006.01) | |

(52) U.S. Cl.
CPC ............ *B60R 25/04* (2013.01); *B60R 25/241* (2013.01)

(58) Field of Classification Search
CPC ....... B60R 25/04; B60R 25/241; B60R 25/01; B60R 25/24
See application file for complete search history.

(56) References Cited

U.S. PATENT DOCUMENTS

| | | | | |
|---|---|---|---|---|
| 2004/0150508 A1* | 8/2004 | Mosgrove | ............. | B60R 25/241 340/5.21 |
| 2009/0128356 A1* | 5/2009 | Nitta | .................. | G07C 9/00896 340/4.36 |
| 2020/0398789 A1 | 12/2020 | Wakita et al. | | |

FOREIGN PATENT DOCUMENTS

| | | | | | |
|---|---|---|---|---|---|
| CA | 3049747 A1 | * | 8/2018 | ............. | B60K 20/02 |
| CN | 102897035 A | * | 1/2013 | ............. | B60K 35/00 |
| JP | 2016-094134 A | | 5/2016 | | |
| JP | 2016-203744 A | | 12/2016 | | |
| JP | 2021-109518 A | | 8/2021 | | |
| JP | 2022-056577 A | | 4/2022 | | |

(Continued)

OTHER PUBLICATIONS

English translation of JP-2016094134-A (Year: 2016).*

(Continued)

*Primary Examiner* — Yong Hang Jiang
(74) *Attorney, Agent, or Firm* — Harness, Dickey & Pierce, P.L.C.

(57) ABSTRACT

A user management system is provided for a working vehicle that can enhance the security and, at the same time, can easily manage a working situation of a user on a working vehicle. A user management system for a working vehicle performs a user management operation including user authentication based on user information that is inputted via a display part mounted on the working vehicle. The control unit determines whether or not a user identification ID inputted via the display part and registered user identification ID registered in advance agree with each other. The control unit determines whether or not an engine start button is pushed for a predetermined time or longer in a case where the user identification ID and the registered user identification ID registered in advance agree with each other, and (Continued)

starts an engine when the engine start button is pushed for the predetermined time or longer.

2 Claims, 7 Drawing Sheets

(56) References Cited

FOREIGN PATENT DOCUMENTS

| | | | |
|---|---|---|---|
| JP | 2023-083267 A | 6/2023 | |
| WO | WO-2009139360 A1 * | 11/2009 | ............. B60L 15/20 |
| WO | 2019-043954 A1 | 3/2019 | |

OTHER PUBLICATIONS

English translation of JP-2023083267-A (Year: 2023).*
Extended European Search Report issued in foreign counterpart EP application 24154993.0; mailed Jul. 17, 2024 (8 pages).
Office Action issued in the corresponding Japanese Patent Application No. 2023-185274; mailed on Apr. 16, 2024 (total 7 pages).

* cited by examiner

USER MANAGEMENT SYSTEM FOR WORKING VEHICLE

CROSS REFERENCE TO RELATED APPLICATIONS

This application claims s priority to Japanese Patent Application No. 2023-185274, filed on Oct. 30, 2023, which is expressly incorporated herein by reference in its entirety.

TECHNICAL FIELD

The present invention relates to a user management system for a working vehicle.

BACKGROUND ART

As a working vehicle such as a construction machine, there has been known, for example, a crawler-type skid-stair loader. An arm that is vertically movable upward and downward is mounted on a vehicle body of such a working vehicle. An attachment such as a bucket is detachably mounted on a distal end of the arm. The working vehicle can perform various works such as digging soil by vertically swinging the bucket, for example, and conveying the dug soil. The machine for working can perform various works by detachably exchanging the attachment in conformity with a purpose of the work.

With respect to the working vehicle of this type, a cabin in which a user boards is mounted on an upper portion of the vehicle. In the cabin, in the vicinity of an operator sheet on which the used is seated, a first control lever (manipulation lever) provided for making the working vehicle perform traveling, and a second manipulation lever provided for operating an attachment such as a bucket are disposed (see JP Patent Publication No. 2022-056577).

In the cabin of the working vehicle such as a construction machine, a display device (a monitor) is disposed. The display device allows the user to visually recognize a working state (for example, turning on and off of an engine) of the working vehicle (see JP 2022-056577). In the display device, when the user performs a switching operation of a display screen, a kind of a screen to be displayed is changed. For example, various kinds of screens such as screens relating to the situations of respective parts of the working vehicle such as a water temperature or an oil temperature, a screen relating to a maintenance and the like are displayed.

In such a working vehicle, an engine is started by inserting a key into a key cylinder and by rotating the key to an engine start position. Any user is requested to perform substantially the same manipulation. Recently, a work management of a user has become important for facilitating the efficiency of working. Further, from a viewpoint of security, it is important to oblige users to possess user identification IDs that differ from each other.

The present invention has been made in view of such tasks to be solved, and it is an object of the present invention to provide a user management system for a working vehicle that can enhance the security and, at the same time, can easily manage a working situation of a user on a working vehicle.

SUMMARY

[1] A user management system for a working vehicle according to the present embodiment is a user management system for a working vehicle that performs a user management operation including user authentication based on user information inputted via a display part provided to a working vehicle. The user management system for a working vehicle includes a control unit that determines whether or not a user identification ID inputted via the display part and registered user identification ID registered in advance agree with each other. In a case where the user identification ID and the registered user identification ID registered in advance agree with each other, the control unit determines whether or not an engine start button is pushed for a predetermined time or longer, and starts an engine when the engine start button is pushed for the predetermined time or longer. Accordingly, only an operator who succeeds in the user authentication can start the engine and hence, both the security and the safety can be enhanced. Further, a user who is specified by the user identification and an operation history including the starting of an engine after the user identification can be associated with each other and hence, it is possible to easily perform the fine user management.

[2] In the user management system for a working vehicle according to the present embodiment, it is preferable that the user management system for a working vehicle have at least a database and a registration processing part. The database stores user information having the user identification ID and user operation history information including setting information relating to mechanisms of the working vehicle. The registration processing part performs the registration and the updating of the user identification ID and the user operation history information that are stored in the database in response to an access by the user. The access includes inputting to a display part. The user identification ID and the user operation history information that are stored and updated are displayed on the display part. Accordingly, the operation history information is displayed for each user and hence, various operation settings performed in the previous-time use is understood. As a result, time and efforts for performing various operation settings from the beginning each time are omitted and hence, the efficiency of the operation can be enhanced.

[3] In the user management system for a working vehicle according to the present embodiment, the user includes a manager and an operator. It is preferable that a scope of access authority to the user information differ between the manager and the operator. By clarifying the scope of authority of the manager and the scope of authority of the user, an operation range of the manager and an operation range of the user can be distinguished from each other and hence, a smooth operation management can be realized.

[4] In the user management system for a working vehicle according to the present embodiment, a different RFID tag is distributed to each user, and the control unit determines whether or not a tag user ID assigned to the RFID tag agrees with a tag user ID that is registered in advance. When the tag user ID assigned to the RFID tag agrees with the tag user ID that is registered in advance, the control unit determines whether or not the engine start button is pushed for a predetermined time or longer, and starts the engine when the engine start button is pushed for a predetermined time or longer. Accordingly, in a case where the user fails in the user authentication performed using the display part, such a configuration functions as another authentication means that uses the RFID tag and hence, the user authentication processing is performed with more certainty.

Advantageous Effects of Invention

The user management system for a working vehicle according to the present embodiment can enhance the secu-

BRIEF DESCRIPTION OF THE DRAWINGS

FIG. 7 is a view illustrating a language setting screen formed of characters or the like.

DETAILED DESCRIPTION

In the description made hereinafter, in a case of describing with respect to "up", "down", "left" and "right", assume a side of a bottom surface of a working vehicle 10 as "down", a side opposite to the bottom surface indicates as "up", a side of a left side surface of the working vehicle 10 when the working vehicle 10 is viewed from a rear surface of the working vehicle 10 as "left" and a side of a right side surface of the working vehicle 10 when the working vehicle 10 is viewed from the rear surface of the working vehicle 10 as "right".

[Configuration of Working Vehicle]

Figure 1:
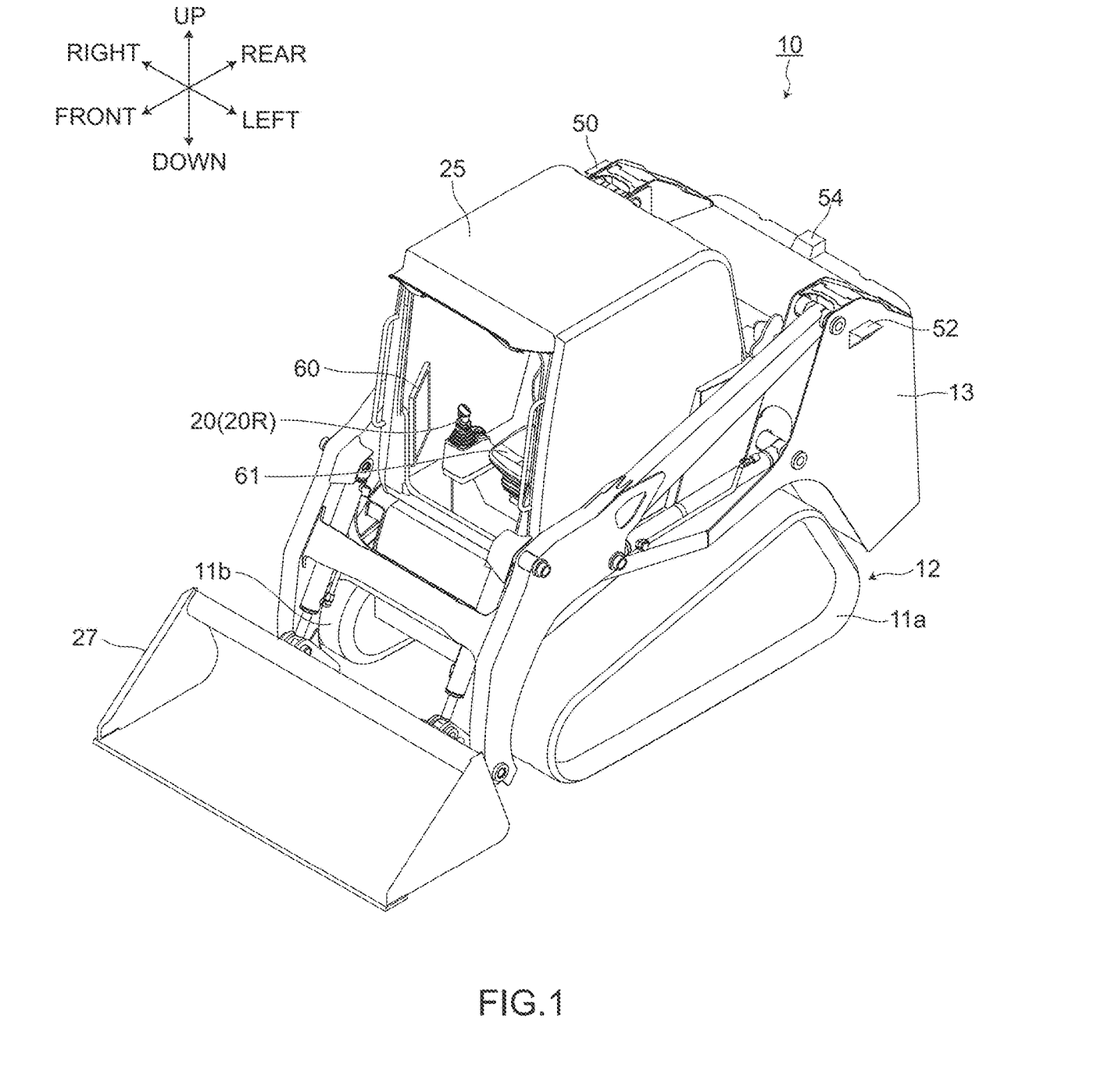
FIG. 1 is a perspective view of a working vehicle on which a user management system for a working vehicle according to an embodiment is mounted as viewed from an oblique front side.
Figure 2:
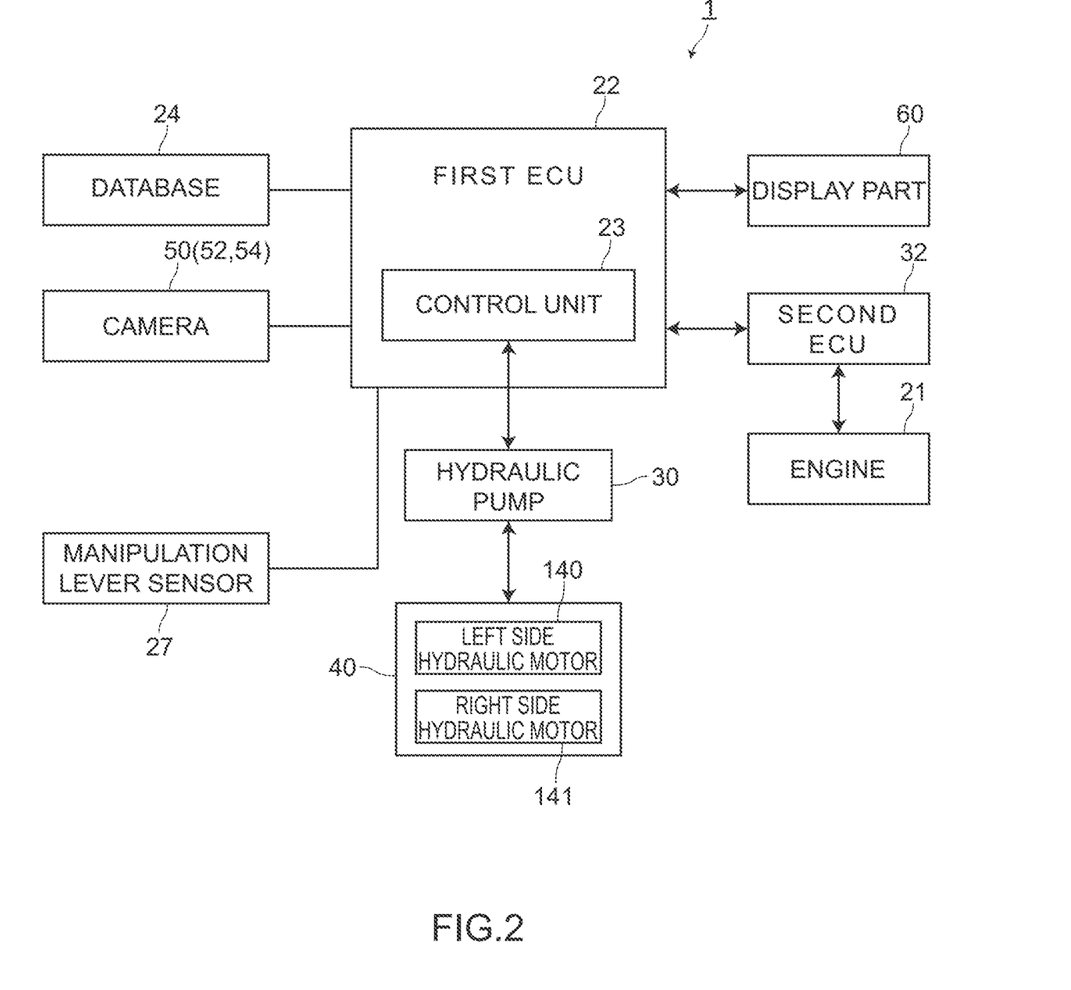
FIG. 2 is a block diagram illustrating the configuration of the user management system for a working vehicle according to the embodiment.
Figure 3:
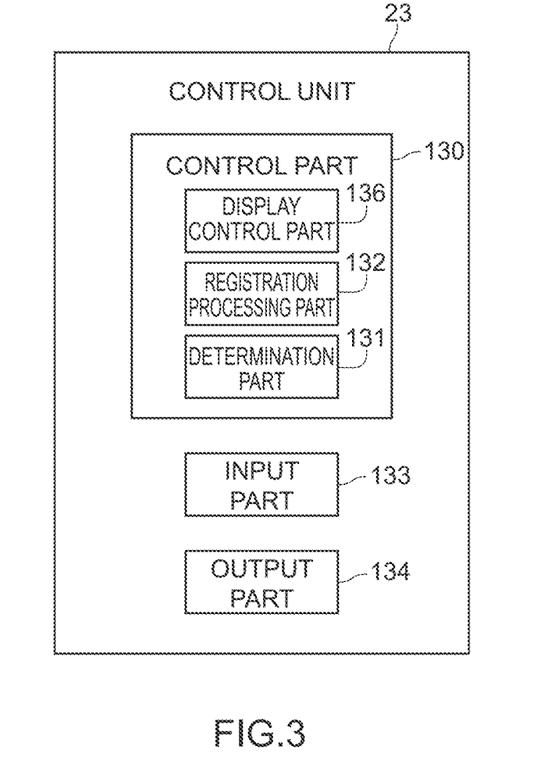
FIG. 3 is a block diagram illustrating the configuration of a control unit.
Figure 4:
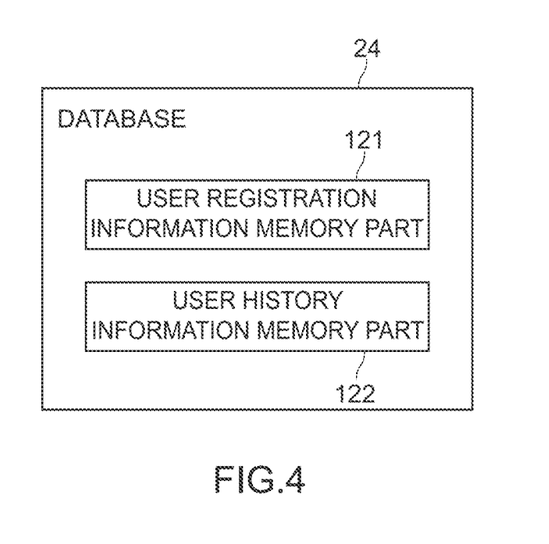
FIG. 4 is a block diagram illustrating the configuration of a database.
Figure 5:
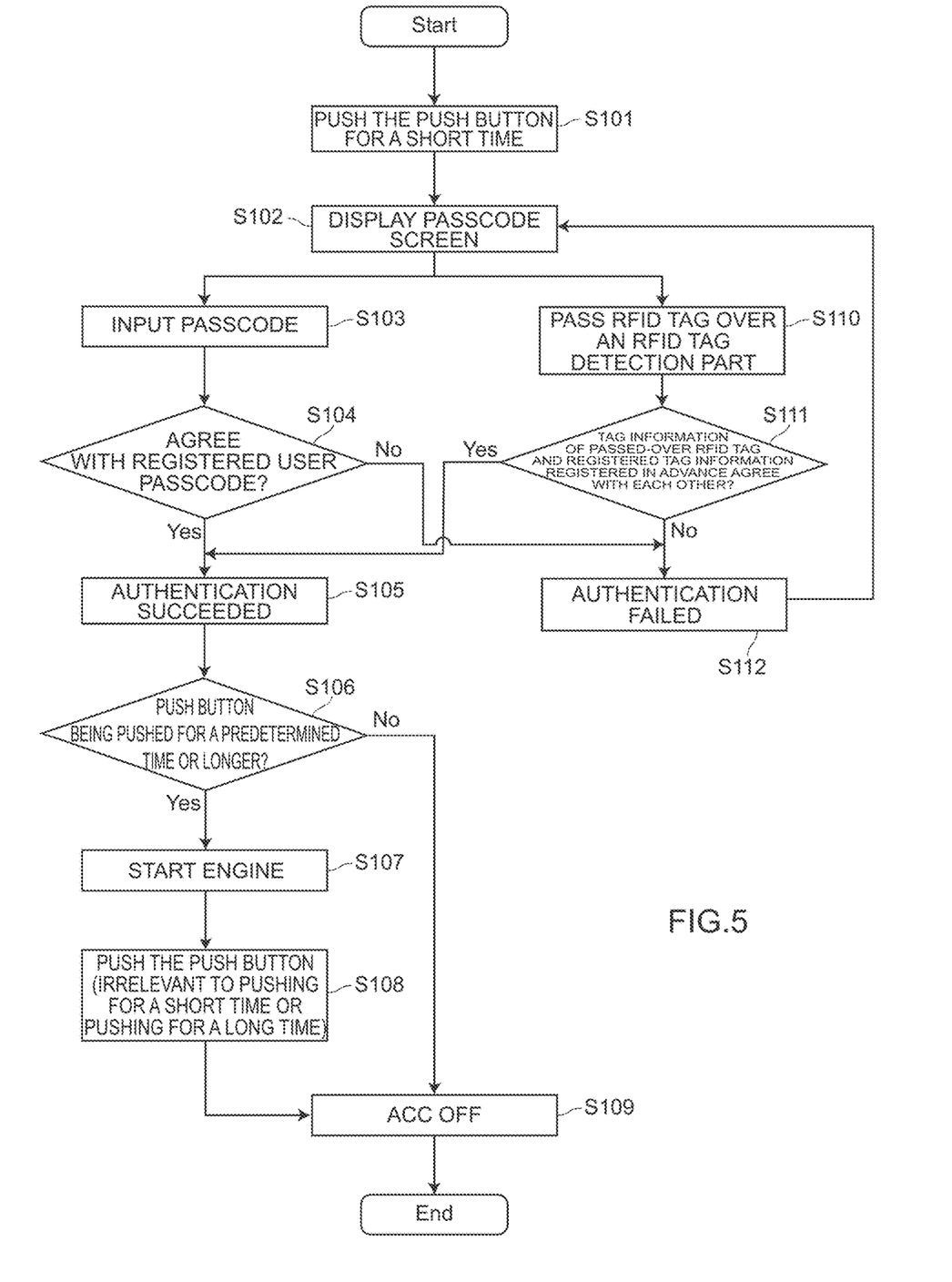
FIG. 5 is a flowchart for describing user authentication processing performed by the control unit.
Figure 6:
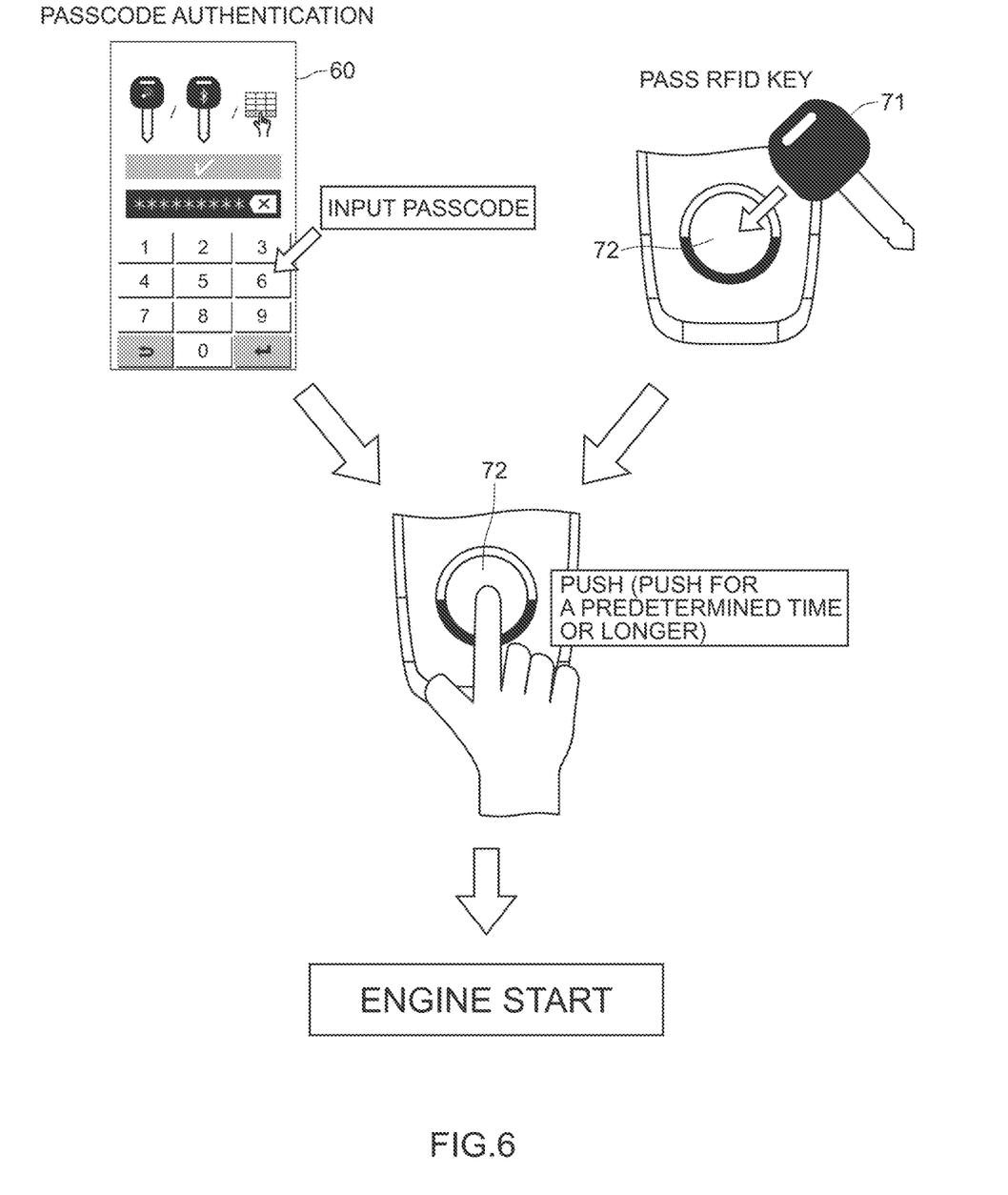
FIG. 6 is a view schematically illustrating the flow of processing from the user authentication to starting of an engine.
Figure 7:
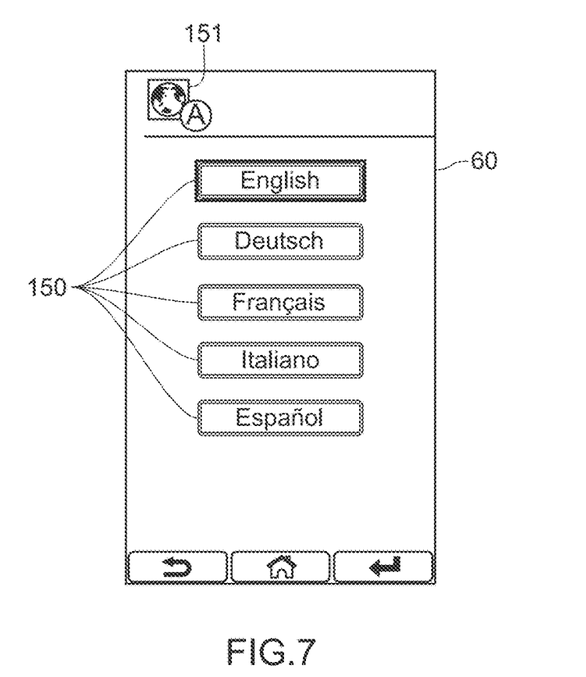
Figure 8:
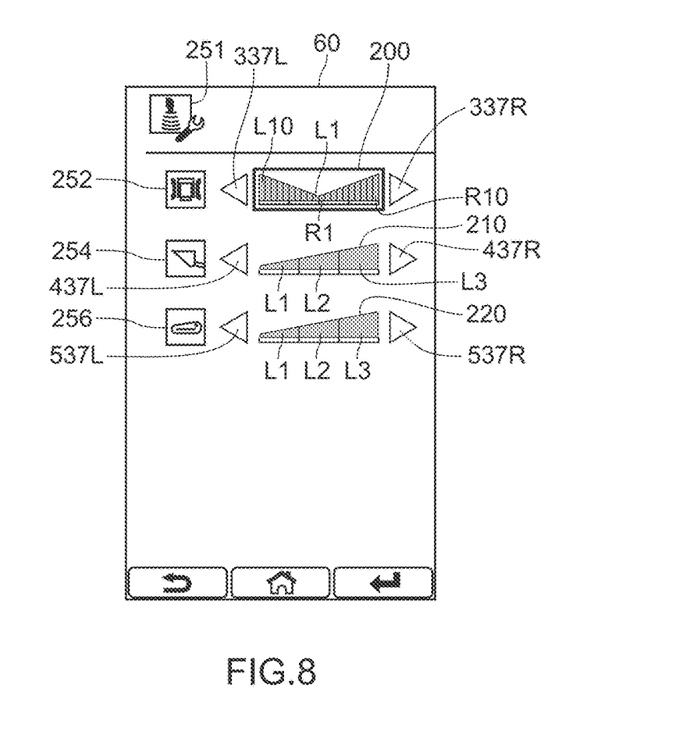
FIG. 8 is a view illustrating operation setting screens of respective mechanism of a working vehicle.

Hereinafter, an embodiment of the present invention is described in conjunction with drawings. With respect to the user management system 1 for a working vehicle according to the embodiment, the description is made hereinafter by taking a crawler-type skid-stair loader where a bucket is mounted on a distal end of an arm as an example of the working vehicle. FIG. 1 is a perspective view of the working vehicle on which the user management system for a working vehicle according to the embodiment is mounted as viewed from an oblique front side. Further, the configuration of the external appearance of the working vehicle 10 according to the embodiment does not form the gist of the present invention and hence, such a configuration is described only schematically. FIG. 2 is a block diagram illustrating the configuration of the user management 1 system for a working vehicle according to the embodiment. FIG. 3 is a block diagram illustrating the configuration of a control unit. FIG. 4 is a block diagram illustrating the configuration of a database. FIG. 5 is a flowchart for describing user authentication processing performed by the control unit. FIG. 6 is a view schematically illustrating the flow of processing from the user authentication to starting of an engine. FIG. 7 is a view illustrating a language setting screen formed of characters or the like. FIG. 8 is a view illustrating operation setting screens of respective mechanism of the working vehicle.

Figure 9:
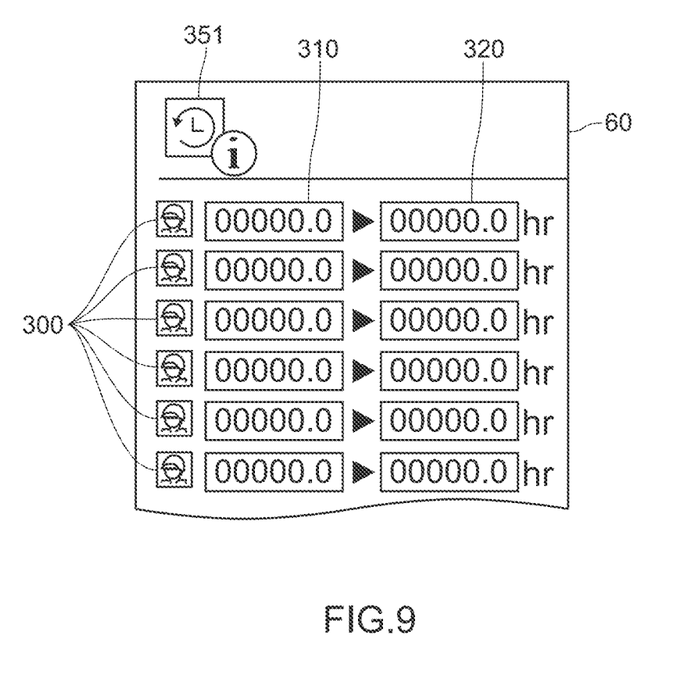
FIG. 9 is a view illustrating a working history information screen of the user.

FIG. 9 is a view illustrating a working history information screen of the user. In FIG. 2 to FIG. 9, the same symbols are used with respect to constitutional components equal to constitutional components illustrated in FIG. 1.

As illustrated in FIG. 1, a working vehicle 10 includes: a traveling device 12; a body frame 13 on which the traveling device 12 and the like are mounted; and a cabin 25 mounted on an upper portion of the center of the body frame 13. The traveling device 12 includes: left and right endless crawlers (here in after referred to as "crawlers") 11a, 11b; a hydraulic pump 30; and hydraulic motors 40. The working vehicle 10 includes: a body frame 13 having the traveling device 12 mounted on left and right sides thereof; and the cabin 25 mounted on the upper portion of the center of the body frame 13.

The cabin 25 is formed in a box shape. In the cabin 25, an operator seat 61 on which a user is seated facing the front side of the vehicle. In the cabin 25, in the vicinity of the seat, manipulation levers 20 (a right-side manipulation lever 20R, a left-side manipulation lever (not illustrated in the drawing)) for performing a traveling operation of the working vehicle 10 and for operating an attachment such as a bucket are disposed. Further, a display part 60 is disposed at a position in the vicinity of the manipulation levers 20 where the display part 60 can be easily and visually recognized. The display part 60 displays a menu screen that receives user authentication processing from a user, an operation state (a lever manipulation sensitivity and the like) and a maintenance situation and the like of the working vehicle. On the display part 60, kinds of screens to be displayed are changed by a switching operation of the display screens by the user.

Further, in the working vehicle 10, an engine 21 (see FIG. 2) is disposed at a position behind the cabin 25. The engine 21 is covered by the body frame 13 extending in the lateral direction. Inside the body frame 13 extending in the lateral direction, a first ECU (Electronic Control Unit: ECU) 22 (see FIG. 2) that functions as a control unit for controlling operations of the hydraulic pump 30 (see FIG. 2), the display part 60 and the like in a comprehensive manner, a second ECU 32 (an engine ECU) that controls the engine 21, and a battery (not illustrated in the drawing) are disposed. The first ECU 22 is electronically connected to the second ECU 32, the hydraulic pump 30, the display part 60 and the battery. The second ECU 32 is electronically connected to the engine 21 and the battery.

The hydraulic pump 30 is driven by the engine 21. The hydraulic motor 40 is constituted of a left-side hydraulic motor 140 and a right-side hydraulic motor 141. The hydraulic motor 40 is rotated by a pressurized oil (a working oil) that is pumped out from the hydraulic pump 30. The pressurized oil from the hydraulic pump 30 is supplied to or discharged from the left-side hydraulic motor 140 and the right-side hydraulic motor 141 in response to control signals from a hydraulic pump control unit (not illustrated in the drawing) that constitutes the control part 130. The left-side crawler 11a is driven by the left-side hydraulic motor 140, and the right-side crawler 11b is driven by the right-side hydraulic motor 141. That is, the left-side crawler 11a and the right-side crawler 11b are configured to be driven independently from each other. In this embodiment, the case is assumed where one hydraulic pump 30 is used. However, the working vehicle 10 may include two hydraulic pumps in total consisting of a hydraulic pump that corresponds to the left-side hydraulic motor and a hydraulic pump that corresponds to the right-side hydraulic motor.

A rotational frequency sensor (rotational speed sensor; not illustrated in the drawing) is mounted on the left and right hydraulic motors 40 respectively. The first rotational frequency sensor measures a rotational frequency of the left hydraulic motor 40, and the second rotational frequency sensor measures a rotational frequency of the right hydraulic motor 40. The detected rotational frequencies of the first rotational frequency sensor and the second rotational frequency sensor are transmitted to the first ECU 22. The first ECU 22 determines whether or not a traveling operation control described later is to be performed based on traveling speeds of the crawlers 11a, 11b based on the rotational frequencies detected by the first and second rotational frequency sensors, and traveling mode information described later.

A 270 degrees camera (automatic backup camera) 50 is mounted on an upper side of the right side surface of the cabin 25. A 270 degrees camera (automatic backup camera) 52 is mounted on an upper side of the left side surface of the cabin 25. A 270 degrees camera (automatic backup camera) 54 is mounted on an upper side of a back surface of the cabin 25. These 270 degrees cameras (automatic backup cameras) 50, 52, 54 image the surrounding of the working vehicle 10, and the imaged data of the surrounding is displayed on the display part 60.

(User Management System)

Hereinafter, the description is made with respect to a user management system 1 for a working vehicle that performs the user management based on input information from a user (user information: user identification information, working history information of the user and the like described later) with reference to FIG. 2 to FIG. 5.

The user management system 1 for a working vehicle includes the first ECU 22, a database 24, the second ECU 32, a manipulation lever sensor 27, the 270 degrees cameras 50, 52, 54 and the display part 60. The first ECU 22 includes a control unit 23. The first ECU 22 is a microcomputer that is constituted of, for example, a central processing unit (CPU), read only memory (ROM), a random access memory (RAM), an input/output port, and a communication port, all of which not being illustrated in the drawing. As signals inputted to the first ECU 22, for example, information on rotational frequencies of left and right drive shafts from the rotational frequency sensors that are independently provided and the like are named. Various control signals are outputted from the first ECU 22 via the output port. As signals outputted from the first ECU 22, for example, a control signal to the hydraulic pump 30 is named.

The manipulation lever sensor 27 is an angular sensor mounted on a manipulation lever 20 (for example, a joystick) that is manipulable in an inclined manner toward the front, the rear, the left and the right. As the manipulation lever sensor 27, for example, a potentiometer is named. The manipulation lever sensor 27 detects whether or not a manipulation direction of the manipulation lever falls within a range (180 degrees) from a front side (meaning straight advancing) to the left and the right (meaning the movement in the lateral direction), and whether or not an inclination amount exceeds a predetermined inclination amount based on a lever angle. For example, when the manipulation lever is tilted toward an upper limit in a frontward direction in a case where the predetermined inclination amount is set to an inclination maximum value (so-called a full lever), it is detected that the manipulation lever sensor 27 is in a straight-advancing and full-lever state. Provided that the above-mentioned operation can be detected, the detection method is not limited to such a method.

The display part 60 is a touch panel monitor, and functions as a user interface which allows inputting of information to the first ECU 22. The touch panel monitor has a display panel and a touch panel. The display panel is a liquid crystal panel or an organic electro luminescence (EL) panel. Various figure information, text information, and the like are displayed on the display panel, and buttons and the like are also displayed on the display panel. The touch panel is disposed on the display panel in an overlapping manner. As the touch panel, a resistance-type touch panel or a capacitive touch panel can be used.

The control unit 23 includes a control part (a main controller 130), an input part 133, and an output part 134. The control part 130 includes a determination part 131, a registration processing part 132, and a display control part 136. The control display part 136 receives an authentication result of user authentication based on input information from the input part 133 and a determination result relating to starting of an engine from the determination part 131 based on selection information described later by a user, and generates and outputs a control signal for displaying the authentication result and the determination result.

Further, the control part 130 generates and outputs a control signal for adjusting a working oil amount of the hydraulic pump 30 that is an operation controlled object. By adjusting the working oil amount, a rotational frequency of the drive shaft is controlled so that a traveling speed of the working vehicle 10 and an upward and downward movement speed of the arm can be controlled. The determination part 131 determines whether or not user identification information (a passcode) inputted via the input part 133 agrees with user identification information of the user registered in advance. In a case where these user identification information agree with each other, it is determined that the inputted user is the registered user. Further, the determination part 131 determines whether or not a displacement (a discharge amount) of the hydraulic pump 30 is to be limited corresponding to a detection result from the rotational frequency sensor, the manipulation lever sensor 27 and the like, and outputs the determination result. The passcode is set for each user, and is the combination of a plurality of alphabets and numerals. The passcode is changeable. The number of numerals is not limited to plural and the alphabets may contain capital and small letters, for example. The user identification information is not limited to the passcode, and the user identification may be performed by an authentication method such as finger print authentication, voice authentication, face authentication or the like.

To the input part 133, via the touch panel of the display part 60, user identification information, user registration information (name, attribute and the like), operation history information of the user including setting of information relating to various mechanisms by the user (traveling lever sensitivity setting, attachment lever sensitivity setting and the like) and the like are inputted. In addition to the above, detection results from a rotational frequency sensor, a manipulation lever sensor 27 and the like are inputted to the input part 133. The attribute information is information that specifies whether the user is a manager (for example, a person who has authority to browse or change all of various setting information) or an operator (for example, a person who has authority to browse or change only some of various setting information). From the output part 134, control signals (an operation control signal, a display control signal and the like) from the control unit 130 are outputted to a controlled object (the hydraulic pump 30, the display part 60 and the like). The database 24 includes: a user registration information memory part 121 and a user history information memory part 122. The user registration information memory part 121 stores user identification information and the user registration information that are used for user authentication described later. The user history information memory part 122 stores the operation history information (including the operation setting content of the working vehicle 10) of the user. The registration processing part 132 registers the user identification information, the user registration information, and the operation history information (including the operation setting content of the working vehicle 10) of the user that are acquired from a user side in advance in the database 24 and, at the same time, when an updating signal is issued, the registration processing the part 132 updates user identification information, the user registration information, and the operation history information (including the operation setting content of the working vehicle 10) of the user that are already registered in the database 24.

The display part 60 is disposed in front of an operator's seat in the cabin 25 of the working vehicle 10. On the display part 60, a user authentication reception screen, an operation history information screen (including the operation setting content of the working vehicle 10) of the user and the like are displayed based on predetermined display control signals from the display control part 136.

[User Authentication Processing]

Hereinafter, the processing how the user authentication is performed specifically is described with reference to a flowchart illustrated in FIG. 5. When a push button 72 (an engine start button: see FIG. 6) is pushed for a short time (step S101), a passcode authentication screen is displayed on the display part 60 (step S102). The passcode authentication screen is a screen that urges the user to input a passcode of predetermined number of digits as illustrated in FIG. 6. In the example illustrated in FIG. 6, the screen that urges the inputting of the passcode is displayed. However, to enhance security, inputting of a passcode may be urged after a user ID is inputted.

In step S103, when the passcode is inputted to the display screen of the display part 60, in step S104, the determination part 131 compares the inputted passcode with an already registered passcode of the user stored in the user registration information memory part 121 of the database 24. Then, when the inputted passcode agrees with the already registered passcode of the user, the determination part 131 determines that the user succeeded in authentication (step S105) and determines that the inputted user is the already registered user. Next, in step S106, the determination part 131 determines whether or not the push button 72 is pushed for a long time for a predetermined time or longer. When the push button 72 is pushed for a long time for a predetermined time or longer, and the second ECU 32, by receiving the determination result, starts the engine 21 (step S107). Then, when the push button 72 is pushed for a long time or is pushed for a short time (step S108), an accessory power source is turned off (step S109) and the processing is finished.

Processing returns to step S104. In a case where the inputted passcode does not agree with the passcode of the user registered in advance in step 104, the determination part 131 determines that the user failed in the authentication (step S112), and the processing returns to step S102.

(Modification)

Also in a case where the user does not input the registered passcode on the passcode inputting screen in step S102, when an RFID tag (RFID key) illustrated in FIG. 6) 71 (see FIG. 6) having tag information that differs for each user is distributed, such tag information can be used as a passcode for user authentication. An RFID tag detection part (not illustrated in the drawing: reading reader) that reads the tag information of the RFID tag 71 is disposed in the vicinity of an engine start button 72 (push button: see FIG. 6). An individual ID (tag user ID) is attached to the RFID tag 71, and information relating to name, attribute and the like of a user (an operator) and the like are registered (stored) in the database 24. The information relating to attribute is information for distinguishing whether the user is a manager or an operator.

Hereinafter, the user authentication using the RFID tag 71 is described with reference to FIG. 5 and FIG. 6. Specifically, the user passes the RFID tag 71 over an RFID tag detection part (not illustrated in the drawing: reading reader) (step S110), and the determination part 131 determines whether the tag information of the passed-over RFID tag 71 and the registered tag information registered in advance agree with each other (step S111). Then, in the case where the tag information of the passed-over RFID tag 71 and the registered tag information registered in advance agree with each other, the determination part 131 determines that the user succeeded in authentication (step S105), and determines that the inputted user is the registered user. In step S111, in the case where the inputted passcode does not agree with the passcode of the user registered in advance, the determination part 131 determines that the user failed in authentication (step S112), and the processing returns to step S102.

According to the above-mentioned configuration, only an operator who succeeded in the user authentication can start the engine and hence, the security and the safety can be enhanced. Further, in a case where the user authentication performed by the display part failed, the above-mentioned configuration functions as another authentication unit and hence, user authentication processing can be performed with more certainty.

[Operation History Management of User]

In the user registration information memory part 121 that constitutes the database 24, the user registration information (the passcode, RFID information) that are used for the above-mentioned user authentication are stored. Further, in the user history information memory part 122, the operation history information of the user is stored in an associated manner with each user who performs the operation. The operation history information includes the name of an operator, a user ID, operation date and time, operation contents (for example, an operation time), a language set content described later, operation setting contents of the respective mechanisms and the like. The operation history information is associated with the user and is updated each time the operation is performed. When the display part 60 is activated, a menu display screen (not illustrated in the drawing) is displayed. When a button (for example, an icon) of operation history information displayed on the menu display screen is selected, operation history information relating to an operation time of each user 300 illustrated in FIG. 9, for example, is displayed. Information illustrated in FIG. 9 is displayed as follows. A driving start operation 310 of the working vehicle and a driving finish time 320 of the working vehicle are displayed. When the operation of this time is finished, this operation time is added, and the operation history information is updated in the registration processing unit 132 in a state where the operation history information is associated with the user. Besides the operation time, the content of the operation, information illustrated in the drawing) relating to setting of operations of the respective mechanisms by the working vehicle by the user (setting of a traveling lever sensitivity, setting of an attachment lever sensitivity and the like) are also displayed. The detail of the setting of operations is described later. The information in the browse content and the operation history information that the manager can use and the information in the browse content and the operation history information that the user can use can be limited (the information that the manager can use and the information that the user can use being distinguished from each other). For example, with respect to a browsing operation of the operation content in the operation history information and the registration/cancelation of an operator, only the manager can perform such operations while the operator cannot perform such operations. Alternatively, with respect to the operation setting of the respective mechanisms in the operation history information, only the operator can perform such setting. The above setting limitation is one example, and such limitation on operations (contents that can be operated) can be set such that either one of the manager or the operator can make use of the limitation on operations or both the manager and the operator can make use of the limitation on operations.

In a case of limiting information that the manager and the operator can use amongst the browse contents and the operation history information (that is, distinguishing the amount of information that can be browsed between the manager and the operator), the manager can register the operator and cancel such registration, for example, and hence, the manager can smoothly perform the management of the operator. Further, the manager can browse the operation history information such as the operation time that is associated with each operator displayed on the display part 60. Accordingly, for example, the manager can understand the various operation setting that the operator performed at the time of performing the previous-time use and hence, the manager can understand liking or the like of the operator with respect to operator operation whereby the management of the operator can be efficiently performed. On the other hand, the operator can easily grasp the operations (traveling lever sensitivity setting, attachment lever sensitivity setting) that the operator sets in the past by oneself. Accordingly, in a case where the operator wants to perform the same setting as the past setting, for example, it is unnecessary to perform such setting from the beginning each time and hence, the setting can be finished within a short period whereby the efficiency of the operation is enhanced.

[Setting of Language Such as Characters Displayed on Display Screen]

When the display part 60 is activated, the menu screen (not illustrated in the drawing) is displayed. When the user selects a button relating to language setting information displayed on the menu display screen (for example, an icon 151 illustrated in FIG. 7). For example, a plurality of language selection buttons 150 illustrated in FIG. 7 are displayed. When the operation of this t finished, information relating to the language selected this time is associated with the user and is updated, and after the display part 60 is activated by the user next time, the language such as characters displayed in the display part becomes the language selected previous time. Accordingly, a foreigner who uses a different languages can also easily perform setting and the like.

[Setting of Operations of Respective Mechanisms of Working Vehicle]

When the display part 60 is activated, the menu display screen (not illustrated in the drawing) is displayed. When an operation setting button (for example, an icon 251 illustrated in FIG. 8) relating to respective mechanisms displayed on the menu display screen is selected, for example, a plurality of operation setting icons 252, 254, 256 and operation setting buttons 200, 210, 220 that are indicated in FIG. 8 are displayed.

(Traveling Lever Sensitivity Setting 1)

The operation setting button 200 is provided for enabling setting of traveling lever sensitivities of the traveling device 12 on a right side and a left side at a plurality of stages respectively, (at a level R1 to a level R10 and at a level L1 to a level L10 in FIG. 8). There is a relationship that as the traveling lever sensitivity is increased, the traveling speed is increased. With respect to the operation setting button 200 illustrated in FIG. 8, for example, the left side level is increased corresponding to the number of times that left side level selection buttons 337L is touched, and the right side level is increased corresponding to the number of times that right side level selection buttons 337R is touched. When the setting is completed, the set traveling lever sensitivities are associated with information relating to the user set by the registration processing part 132 and are stored in the database 24.

(Traveling Lever Sensitivity Setting 2)

A traveling lever sensitivity setting button (operation setting button) 220 is provided for enabling setting of traveling lever sensitivity of the working vehicle 10 at three stages (low sensitivity, intermediate sensitivity, normal sensitivity), for example. Such stages are not limited to three stages. The operator pushes down the traveling lever sensitivity setting button 220 so as to select the desired level (the stage) in accordance with operator skill or the content of the operation. With respect to the traveling lever sensitivity setting button 220 illustrated in FIG. 8, for example, in the selection of traveling lever sensitivity, the level of the traveling lever sensitivity is decreased corresponding to the number of times that left side level selection button 537L is touched, and the level of the traveling lever sensitivity is increased corresponding to the number of times that right side level selection buttons 537R is touched. When the setting is completed, the set traveling lever sensitivities are associated with information relating to the user set by the registration processing part 132 and are stored in the database 24.

[Attachment Lever Sensitivity Setting]

The attachment lever sensitivity setting button (operation setting button) 210 is provided for setting the attachment lever sensitivity at three stages (L1 to L3). It is needless to say that the number of these stages is not limited to three. As the attachment lever sensitivity is increased, an operation speed of the attachment is increased. In the operation setting button 210 illustrated in FIG. 8, for example, with respect to the selection of the attachment lever sensitivity speed, the left side level is increased corresponding to the number of times that a left side level selection button 437L is touched, and the right side level is increased corresponding to the number of times that a right side level selection button 437R is touched. When the setting is completed, the set attachment lever sensitivity is associated with information of the user set by the registration processing part 132.

(Other Settings)

As other settings besides the above-mentioned settings, on-off setting of a 270 degree camera constituted of the 270 degree cameras 50, 52, 54 can be named.

The present invention is not limited to the above-mentioned embodiment, and various embodiments are conceivable without departing from the gist of the present invention.

The invention claimed is:

1. A user management system for a working vehicle that performs a user management operation including user authentication based on user information inputted via an input interface provided to the working vehicle, the user management system comprising:
   a database configured to store:
      user information having a registered user ID and a registered tag user ID; and
      user operation history information including an operation time in association with a user of the working vehicle and operation setting information with respect to a mechanism of the working vehicle in association with the user; and
   a processor configured to be programmed to:
      determine whether a user ID inputted via the input interface by the user matches with the registered user ID;
      determine whether a tag user ID assigned to a RFID tag carried by the user matches with the registered tag user ID;
      determine whether an engine start button is pushed for a predetermined time or longer;
      start an engine of the working vehicle when the following condition is met:
         the processor determines that the engine start button is pushed for the predetermined time or longer; and
         one of:
            the processor determines that the user ID matches with the registered user ID; and
            the processor determines that the tag user ID matches with the registered tag user ID;
      update the user information and the user operation history information according to the input via the input interface and the operation of the working vehicle; and
      display the user ID information and the user operation history information on a display screen of the working vehicle,
   wherein the operation setting information includes traveling lever sensitivity setting of a traveling device as the mechanism of the working vehicle and attachment lever sensitivity setting of an attachment as the mechanism of the working vehicle.

2. The user management system for a working vehicle according to claim 1, wherein
   the user includes a manager and an operator, and a scope of access authority to the user information differs between the manager and the operator.

* * * * *